Jan. 18, 1966  FRANK LAI-NGI CHAN  3,230,367
ATTACHMENT TO X-RAY CAMERA COMPRISING TWO
CONCENTRIC CYLINDRICAL CASSETTES
Filed April 23, 1963  4 Sheets-Sheet 1

INVENTOR.
FRANK L. CHAN

BY
ATTORNEYS

Jan. 18, 1966 FRANK LAI-NGI CHAN 3,230,367
ATTACHMENT TO X-RAY CAMERA COMPRISING TWO
CONCENTRIC CYLINDRICAL CASSETTES
Filed April 23, 1963 4 Sheets-Sheet 2

INVENTOR.
FRANK L. CHAN
BY
ATTORNEYS

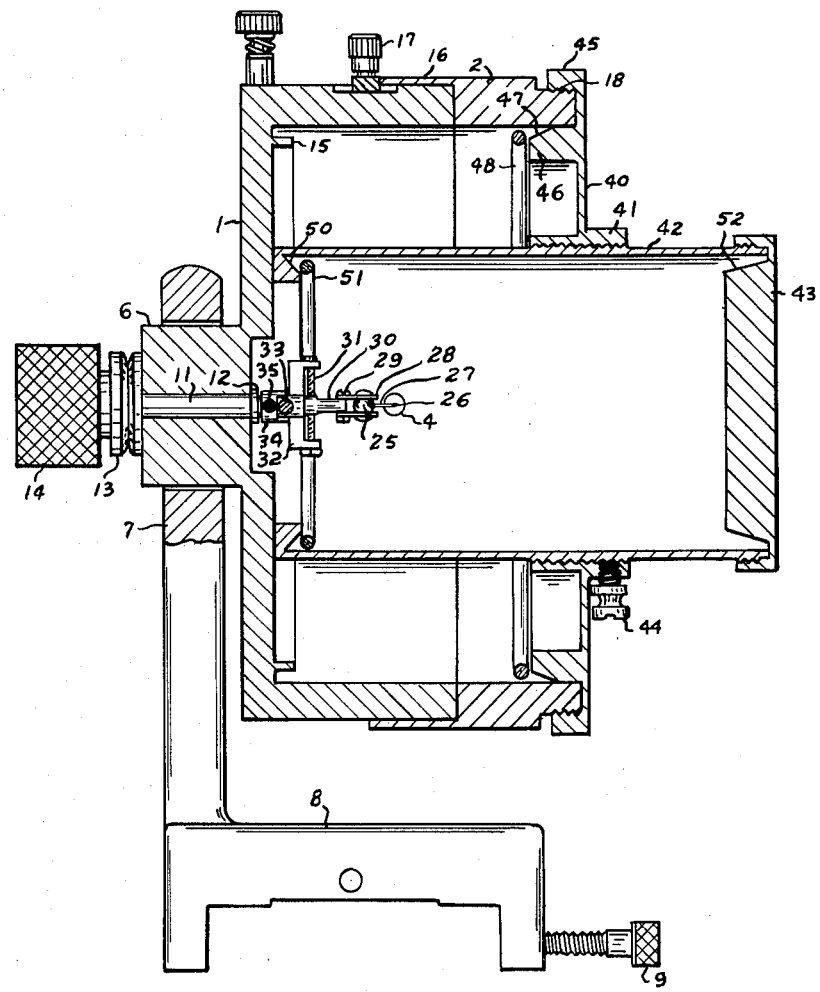
Fig-3
Fig-6
INVENTOR.
FRANK L. CHAN

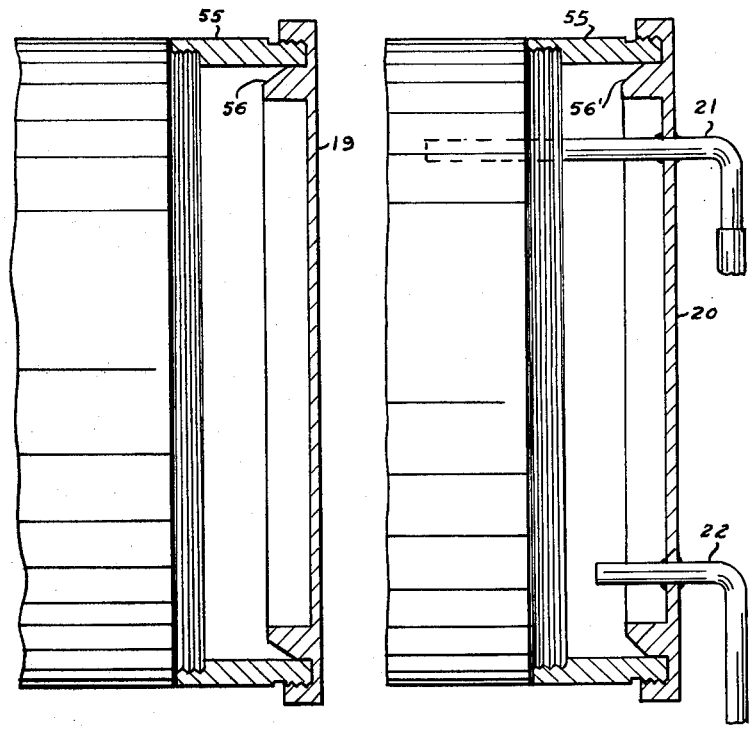

United States Patent Office 3,230,367
Patented Jan. 18, 1966

3,230,367
ATTACHMENT TO X-RAY CAMERA COMPRISING
TWO CONCENTRIC CYLINDRICAL CASSETTES
Frank Lai-Ngi Chan, 3228 Ravenwood Road,
Fairborn, Ohio
Filed Apr. 23, 1963, Ser. No. 275,174
6 Claims. (Cl. 250—68)
(Granted under Title 35, U.S. Code (1952), sec. 266)

The invention described herein may be manufactured and used by or for the United States Government for governmental purposes without payment to me of any royalty thereon, This invention is an attachment to the Norelco X-ray camera for taking powder diffraction pattern pictures of crystals. The attachment increases the usefulness of the camera by adapting it further to the taking of single crystal rotation photographs; using films of a plurality of dimensions; and of single and double exposures on a single film; and with the axis of the single crystal coincident with the axes of a plurality of coaxial cassettes of different dimensions.

The Norelco X-ray precision powder diffraction pattern camera is marketed in two sizes of film diameters 114.59 millimeters and 57.3 millimeters. To obtain this diversity of function, the buying public previously has been required to buy two Norelco cameras. Norelco cameras are illustrated and are explained in commercially available catalogs and in publications of which "X-ray Diffraction Procedures," by Klug and Alexander, published by John Wiley and Sons, Inc., New York, N.Y., is representative and is referred to hereinafter as reference No. 5.

The object of the present invention is to increase threefold the usefulness and to increase the versatility and the precision of the camera with materially improved convenience, time savings, facility of making adjustments, and with important savings in money to the purchaser of the Norelco cameras.

The present invention provides in a single powder diffraction pattern camera an attachment for also taking X-ray, single crystal rotation photographs; and with the axis of the single crystal precisely coincident with the axes of a plurality of coaxially mounted cassettes.

An illustrative apparatus embodying the present invention is shown in the accompanying drawings, wherein:

FIG. 3 is an axial sectional view of the pair of cassettes taken along the line 3—3 of FIG. 2;

FIG. 4 is a fragmentary end view, partly in section, of a modified cap on the large cassettes;

FIG. 5 is a fragmentary end view, partly in section, of a further modified cap on the large cassette adapted to control the atmosphere within the cassettes; and FIG. 6 is a modified screw head for use in the fine adjustment of applicant's goniometer head.

Figure 1:
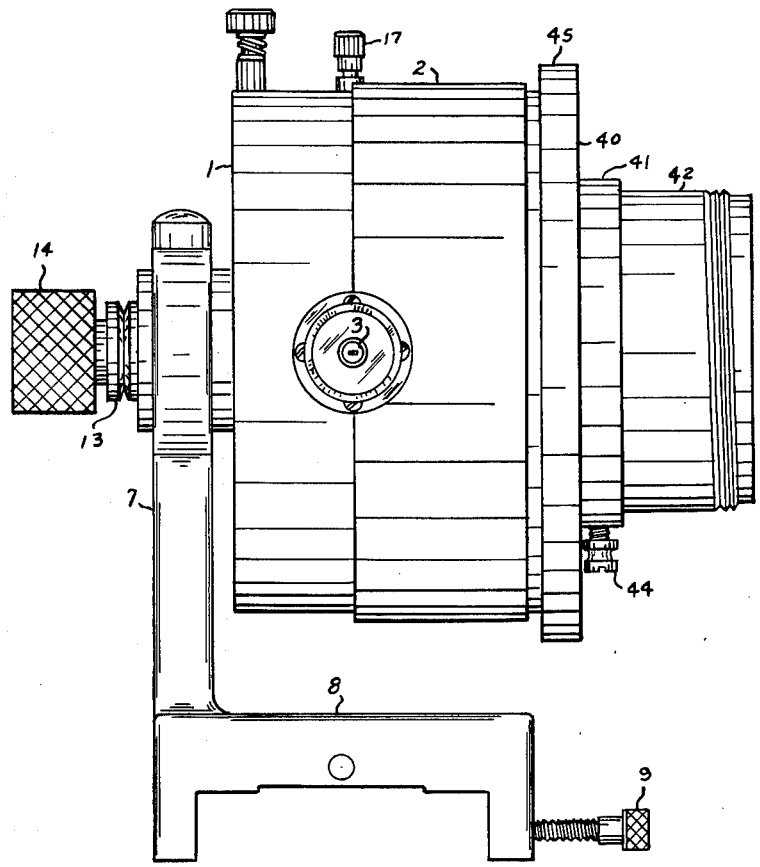
FIG. 1 is a side elevational view of the multiple diameter cassette attachment that embodies the present invention.
Figure 2:
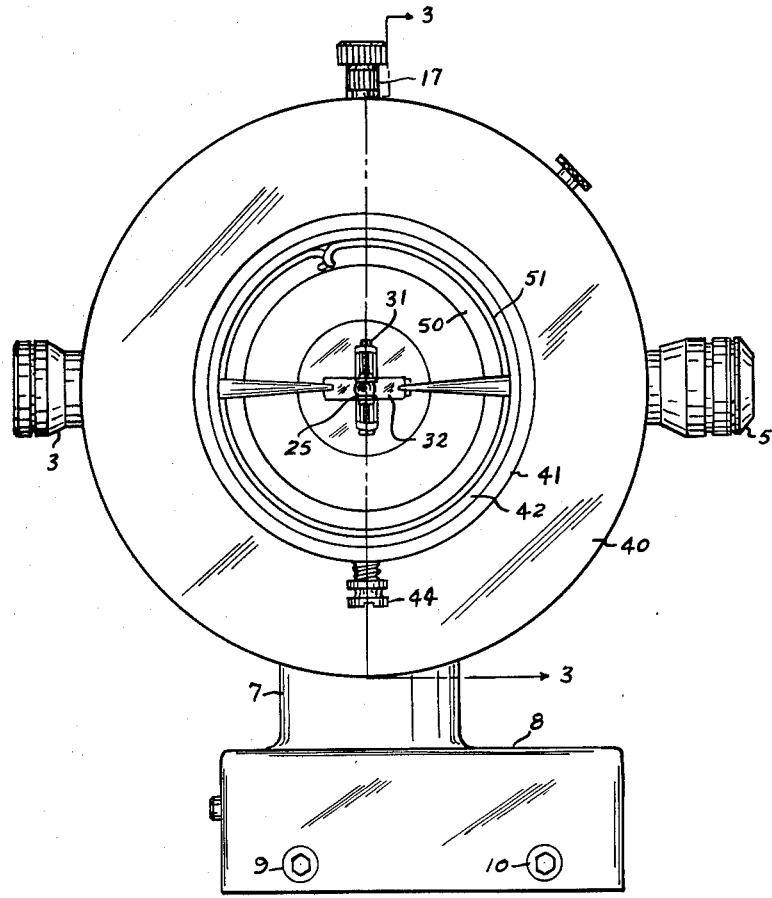
FIG. 2 is an end elevational view of the attachment in FIG. 1 with the cover of the cassette of smaller diameter removed and centering the axis of the crystal sample precisely on the common axes of the two cassettes of different diameters.

The Norelco camera that is modified by the attachment that is disclosed herein is made by Philips Electronics, Inc., of Mount Vernon, New York.

The Norelco camera that is illustrated in FIGS. 1 to 6, inclusive, of the accompanying drawings, comprises the Norelco camera 1 of 114.59 millimeters film diameter with an X-ray beam admitting collimator 3 diametrically opposite from an aperture 4 opening into a beam trap 5, adjusting and attaching screws, etc., that are supported by a cylindrical projection 6 from the camera.

The camera projection 6 seats snugly in an aperture that is adjacent to the upper end of a vertical extending arm 7 that is integral downwardly with a double-jawed clamp 8. The clamp 8 is tightened by a pair of screws 9 and 10 on a beam or the like, not shown. The camera cylindrical projection 6 is bored axially for the journalling therein of a crystal sample spinning rotary shaft 11.

As shown in the sectional view in FIG. 3, the shaft 11 has a collar 12 turned thereon for inserting the shaft in the assembly from inside of the large cylinder, drum or cassette provided by the camera 1.

The crystal sample spinning rotary shaft 11 end that is positioned outside of the camera, and in FIGS. 1 and 3 of the drawings to the left of the camera supporting arm 7, carries a V-belt receiving drum 13 secured thereto by being threaded thereon. The belt receiving drum 13 is threaded externally to receive a shaft rotating and adjusting knurled thumb nut 14 on the exposed end of the shaft, for hand-turning the shaft. A film edge retaining flange 15 is turned inside of and on the base of the camera 1. The screw 17 serves to tighten the film within the large cassette.

The Norelco X-ray camera attachment that is the subject matter here of interest comprises the first collar or sleeve 2 that continues axially as the external overlap flange 16 for supplementing the length of the large cassette. The first sleeve flange 16 overlies the outside of the cylindrical wall portion of the camera 1 at the junction thereof in light-tight relation therewith and is secured thereto by the screw 17, or the like. The sleeve 2 has a cylindrical internal surface that is continuous with the internal surface of the camera 1 to provide a large cassette therewith of a desired axial dimension.

The edge of the first collar or sleeve 2 that is remote from the camera 1, is threaded externally at 18 to receive a closure member, such as the cap 19 shown in FIG. 4, or the gas circulating cap 20 shown in FIG. 5. Pipes 21 and 22 are welded through the cap 20 for the purpose of circulating a gas, such as helium, through the interior of the closed cassette. The helium atmosphere decreases the time necessary for taking diffraction pictures. In certain instances the time can be reduced by as much as three-fourths that normally required, i.e., from four hours at one hour.

The crystal sample spinning shaft 11 end that is positioned inside of the camera larger cassette, that consists of the camera 1 and the first sleeve 2, carries a desired goniometer head assembly.

The preferred goniometer head assembly is an improved modification of that disclosed in the Frank L. Chan patent application Serial No. 206,103, filed June 28, 1962, now Patent No. 3,160,748.

The Chan goniometer head assembly, in addition to providing a mount for a powdered crystal sample in a glass capillary tube, permits the mounting thereon of a single crystal, as preferred.

The assembly provides the further improvement of permitting the adjustment of a single crystal, such that its axis is precisely on the axis of the film mounted against the smooth inner cylindrical surface of the large cassette, with one film edge disposed back of the flange 15 and the opposite film edge pressed radially outwardly by the radially outwardly expansible discontinuous expansion spring 48. Other goniometer heads at best permit the adjustment of an experimental crystal with its axis parallel to, rather than precisely on the axis of the cassette within which the crystal is positioned, which is unique with the Chan goniometer head assembly.

The Chan goniometer head assembly that is illustrated in FIG. 3 of the accompanying drawings, comprises a spherical goniometer head 25 that may be smooth or that may be apertured, as preferred, and that is shown apertured with a single crystal 26 cemented to the distal end of a glass capillary tube 27 that has its proximal or attached end in an aperture in the goniometer head 25.

The goniometer head 25 is yieldingly retained between a pair of spring metal strips 28, that are secured by a bolt 29 to a first block 30 through which a first screw 31 is threaded. An X-shaped double yoke 32 has one pair of ears in which the first screw 31 turns and a second pair of ears through which a second screw 33 that is normal to the first screw 31, turns. The second screw 33 threads on a second block 34 that is secured by the set screw 35 to the end of the crystal turning shaft 11 that is inside of the large cassette.

The heads of the first screw 31 and of the second screw 33 in the adaptations that are shown in FIGS. 3 and 6 of the drawings, are provided with the desired plurality of holes 36, a plurality of crossing screw driver slots, or the like, to receive a finger-held small rod or nail, not shown, for more expeditiously and more accurately adjusting the single crystal 26 axis in registration with the axis of the large cassette.

The first sleeve cover 40 or large cassette cover, threads peripherally on the end of the collar or sleeve 2 that is remote from the camera 1, to provide a camera large cassette of an increased axial dimension. The first sleeve cover 40 is centrally apertured by the radially inwardly threaded and axially extending mid-flange 41. The mid-flange 41 is threaded to receive the small cassette 42 that is threaded externally intermediate its ends, as shown. The inner end of the small cassette rests against the camera and the end of the small cassette 42 that is remote from the camera 1, is closed by the small cassette cover 43. The set screw 44 secures the adjustment of the small cassette 42 with the large cassette cover 40.

The large cassette cover 40 has an axially extending peripheral flange 45 that is threaded on its radially inner face to engage the external threads on the first collar or sleeve 2, with the edge of the first sleeve 2 seated snugly between the threaded flange 45 and the radially inner flange 46. The bevel 47 on the radially outer face of the inner flange 46 draws the edge of the film, not shown, against the cylindrical face of the large cassette where it is further secured by the discontinuous circumferentially expansible wire spring 48.

The cyclindrical inner face of the small cassette 42 is adapted to receive a small diameter film, not shown. At the left hand end of the small cassette, the bevel 50 causes the inner film edge to slide along the bevel to rest flush against the inner surface of the small cassette, where the film position is secured by the circumferentially outwardly expanding discontinuous wire spring 51. At the right hand end of the small cassette 42, the bevel 52 on the cap 43 similarly causes the film to rest closely against the inner surface of the small cassette, where it may be secured by a circular wire spring or not, as preferred.

In FIGS. 4 and 5 are shown a second collar or sleeve 55 of the desired axial dimension to permit the use of films of correspondingly increased length. The film is secured flush against the inner surface of the large cassette comprising the camera 1, the first sleeve 2 and the second sleeve 55 through the agencies of the bevel groove 56 or 56'.

Among the X-ray cameras for taking powder diffraction patterns in the United States, Canada, and elsewhere, the ones manufactured by the Philips Electronics, Inc., are widely used and have many desirable features that are described in the following literature references numbered: (1), (3), and (5). The usefulness of these cameras can be increased to include the taking of X-ray single crystal rotation photographs by the attachments described herein.

The Philips Electronics, Inc., has manufactured two types of powder cameras with film diameters, as follows:
 (a) 114.59 mm., and
 (b) 57.3 mm.

The diffraction lines registered on the film using the 114.59 mm. powder camera can be determined with high precision when the polycrystalline materials are free from strain, are properly treated, and are placed in the correct size of a glass capillary, as is described in the reference No. 5. However, the average exposure time, as stated by the manufacturer, with the 114.59 mm. powder camera, is from one to three hours. Experience has shown that for organic substances, the exposure time could be greater than specified. On the other hand, with the 57.3 mm. powder camera, the exposure time can be greatly reduced, although the resolution of the diffraction lines is somewhat less. The exposure time for the 57.3 mm. powder camera, is five to sixty minutes.

Employing the attachment described in this invention, the 114.59 mm. powder camera can be conveniently used for taking powder diffraction patterns like that from powder cameras having 57.3 mm. diameter. Therefore, a camera of 114.59 mm. diameter may be used, not only as was intended by the manufacturer, but, with the attachment, also as a camera of about one-half the diameter.

The importance and the usefulness of this invention is at once apparent in that when a precise determination of the exact positions of diffraction lines is the primary aim, then the 114.59 mm. camera should be used. However, when the rapid identification of substances is the primary aim, then the attachment is added to the same camera.

Powder patterns taken with this attachment are identical to the ones taken with the Norelco 57.3 mm. powder camera. Since the two Norelco cameras are designed to meet different purposes and objectives, attachments to the 114.59 mm. camera would only extend its usefulness equivalent to two cameras. Reference to a description of the powder method is here made for identification of chemical substances, to distinguish between crystalline substances and to study such phenomena as polymorphism, isomorphism of crystals, coefficient of thermal expansion, and solid solutions.

There are instances in which X-ray powder diffraction patterns cannot be used for identification. There are cases where only a few crystals are available, and the crystals are too valuable to be rendered to powder. For instance, as cited in the reference No. 4, there are hundreds of steriod molecules or natural products having the same size and shape with somewhat the same unit cell. In cases such as these, single crystal data should be taken.

For crystal analysis, the single crystal rotation method is unquestionably the most powerful method, concerning which reference No. 2 is cited. By this method a single crystal is mounted and is rotated about a principal axis. A total of three photographs taken on three principal axes gives almost complete information. From the layer lines and the row lines, one is able to determine the possible reflection from a crystalline zone, and, as a result, derive pertinent data such as lattice parameters, density, number of molecules in a unit cell and other important crystallographic information.

In employing the proposed innovation, one is able to obtain powder patterns of two different sizes, two patterns on the same film and also single crystal rotation photographs. Thus with the attachment, the Norelco camera can perform the dual purpose of taking single crystal rotation photographs and X-ray powder diffraction patterns of different dimensions.

The taking of two patterns on a single film is accomplished by exposing one side of the film with one-half the film covered by a sheet of a material such as copper or lead. The film is then reversed and the unexposed film portion is exposed for the second picture with the metal sheet over the previously exposed film portion. The advantage of a plurality of pictures on the same film compensates accurately for differences in shrinkage in parts of the film. Not only film shrinkage is compensated for by this technique, but also a known crystal may be photographed on one side of the film and the unknown crystal can be photographed on the other side of the same film, and the two crystal patterns are compared in detail.

In summary, this attachment makes four cameras out of one, since it provides: (1) single crystal rotation photographs using the cassette of small diameter; (2) powder crystal rotation photographs using the small cassette; (3) powder crystal rotation photographs using the large cassette; and (4) single crystal rotation photographs by adding to the original camera the sleeve or collar 2 with the appropriate cover. To these four camera adaptations are added an optional helium atmosphere; together with means for photographing beside each other on the same film, both the known and an unknown crystal and thereby minimize the effects of film characteristics such as film shrinkage, irregularities, and the like.

When a second collar or sleeve 55 is attached to the 114.59 mm. camera, as shown in the accompanying drawings, two powder patterns can be taken on a film 76 mm. by 355 mm. Using this attachment, the diffraction lines of the two patterns can be determined and compared with high precision.

Two powder patterns can be taken on one single film if a film having 177 mm. by 93 mm. dimensions is used. This invention can accommodate film of this dimension.

Furthermore the 57.3 mm. diameter and the 114.59 mm. diameter attachments are constructed such that both the Straumanis' and the Wilson's techniques of loading film can be used by the camera attachment that is disclosed herein.

References (1) Azaroff, L. U., Buerger, M. J., The Powder Method in X-ray Crystallography, McGraw-Hill Book Co., Inc., New York, 1958.
(2) Clark, G. L., Applied X-rays, 4th ed., McGraw-Hill, New York, 1955.
(3) Cullity, B. D., Element of X-ray Diffraction, Addison-Wesley Publishing Co., Inc., Massachusetts, 1956.
(4) Fanuchen, I., Anal. Chem. 30, 593, 1958.
(5) Klug, H. P. and Alexander, L. E., X-ray Diffraction Procedure, John Wiley & Sons, Inc., New York, 1954.

It is to be understood that the attachment that is disclosed herein has been submitted as an illustrative, successfully operative embodiment of the present invention and that modifications may be made therein without departing from the spirit and the scope of the present invention.

I claim:

1. The attachment to the Norelco X-ray large cassette camera for the taking of powder diffraction pattern pictures of crystals in adapting the camera to the taking of single crystal rotation photographs, the attachment comprising: a large cassette cover that is centrally apertured by a radially inwardly threaded and axially extending mid-flange; and a small cassette that is threaded axially and externally intermediate its ends for engaging the threads on the large cassette cover mid-flange in securing the small cassette within and concentrically with the large cassette.

2. The attachment defined by the above claim 1 inclusive of a first sleeve with the same internal diameter as the large cassette and that is provided with an axially extending flange overlapping a portion of the outside surface of the camera large cassette in light-tight relation therewith and the sleeve increasing the axial dimension of the camera large cassette and the first sleeve terminating remote from its engagement with the large cassette in means for releasably securing the attachment to the first sleeve.

3. The attachment to the Norelco powder diffraction pattern X-ray camera that comprises a first sleeve extending the axial dimension of the camera and making a light-tight junction therewith and terminating remote from the camera in a threaded portion of the first sleeve remote from the camera as a large cassette for the camera, a first sleeve cover terminating peripherally in a flange that is threaded to engage the threads on the first sleeve in making a light-tight junction therewith and having an inner flange overlapping the radially inner surface of the first sleeve for slidingly directing a film edge thereagainst and the first sleeve cover being centrally apertured by a radially inwardly threaded and axially extending mid-flange, a cylindrical small cassette that is threaded externally to engage the threads on the first sleeve cover mid-flange in mounting the small cassette coaxially inwardly of the large cassette with its inner end bearing against the camera, and a small cassette cover means making light-tight engagement with the exposed end of the small cassette.

4. The attachment to the Norelco X-ray large cassette camera for the taking of powder diffraction pattern pictures of crystals in adapting the camera to the taking of single crystal rotation photographs adapted to the practice of loading films by both the Straumanis technique and the Wilson technique and with the use of a helium atmosphere in reducing the time for the taking of pictures in some instances to one-fourth the time required for taking corresponding pictures with the unmodified Norelco camera, and the attachment comprising a first sleeve of the same internal diameter as the large cassette camera for increasing the axial dimension thereof in light-tight engagement therewith, a large cassette cover that is centrally apertured by a radially inwardly threaded and axially extending mid-flange; a small cassette that is threaded axially and externally intermediate its ends for engaging the threads on the large cassette cover mid-flange in securing the small cassette within and concentrically with the large cassette with its inner end bearing firmly against the inner surface of the camera, a small cassette cover, and a gas circulating means mounted in the small cassette cover for controlling the atmosphere within the small cassette.

5. The attachment defined by the above claim 4 inclusive of cassette cover means for maintaining a helium atmosphere within the cassette that houses the film.

6. The crystal diffraction pattern picture making camera attachment, removably engaging a hollow and cylindrical cassette camera; the camera attachment comprising a first sleeve that is threaded at its edge remote from the cassette camera and that is adapted for being secured to the camera in light-tight engagement therewith, a cassette first sleeve cover with a peripheral flange that is threaded to engage the threads on the first sleeve edge that is remote from the cassette camera in removable relation therewith and the cover being apertured centrally in an axially projecting mid-flange that is threaded on its radially inner face, and a small cassette that is threaded externally intermediate its ends for engaging the threads on the cover mid-flange for securing the small cassette with the cassette first sleeve cover.

(References on following page)

References Cited by the Examiner

UNITED STATES PATENTS

| | | | |
|---|---|---|---|
| Re. 1,593 | 12/1863 | Spratt | 220—3 |
| 2,289,561 | 7/1942 | West | 85—45 |
| 2,258,326 | 10/1941 | Holt | 85—45 |
| 2,940,734 | 6/1960 | Harvey | 220—39 |
| 3,070,694 | 12/1962 | Sommers | 250—51.5 |
| 3,079,500 | 2/1963 | Chan | 250—51.5 |

OTHER REFERENCES

"The General Electric Hayes X-ray Diffraction Unit," by the General Electric X-ray Corporation, March 1938, pages 10 and 11.

RALPH G. NILSON, *Primary Examiner.*

ARCHIE R. BORCHELT, *Examiner.*

H. S. MILLER, A. L. BIRCH, *Assistant Examiners.*